United States Patent Office 3,442,961
Patented May 6, 1969

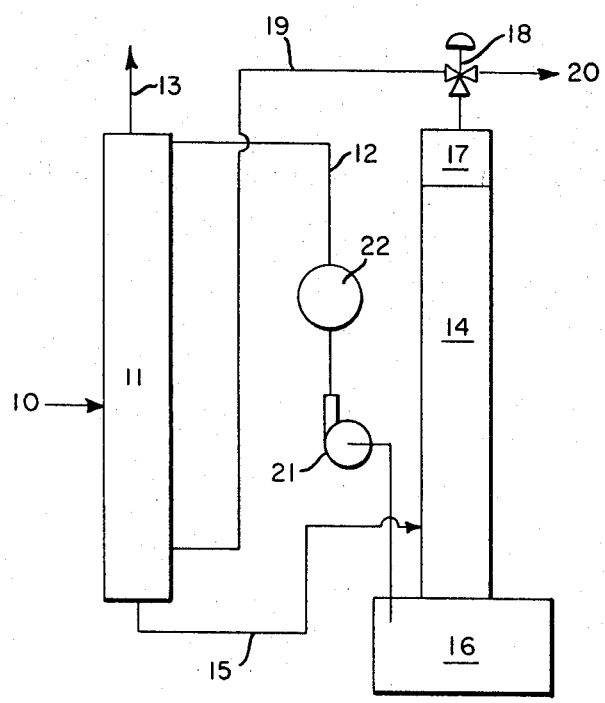

3,442,961
SEPARATION OF HYDROGEN CHLORIDE FROM VINYLIDENE FLUORIDE
David G. Hutton, Newark, Del., assignor to E. I. du Pont de Nemours and Company, Wilmington, Del., a corporation of Delaware
Filed May 3, 1967, Ser. No. 635,747
Int. Cl. C07c 7/02, 21/18, 7/10
U.S. Cl. 260—653.3
7 Claims

ABSTRACT OF THE DISCLOSURE

Gaseous mixtures of vinylidene fluoride and hydrogen chloride are contacted with a liquid chlorobenzene to dissolve the hydrogen chloride.

BACKGROUND OF THE INVENTION

Vinylidene fluoride is manufactured by thermal dehydrochlorination of chloro-1,1-difluoroethane, the latter being prepared by chlorination of 1,1-difluoroethane by one of several available processes. The reaction product of such process contains hydrogen chloride, vinylidene fluoride, chlorodifluoroethane and possibly other products. While 1,1,1-chlorodifluoroethane (B.P. −9.2° C.) and 2-chloro-1,1-difluoroethane (B.P. 35.1° C.) are readily separated from vinylidene fluoride (B.P. −82° C.) and hydrogen chloride (B.P. −85° C.) by distillation, the latter two are not readily separated due to the proximity of their boiling points. Hydrogen chloride may be removed from vinylidene fluoride by water or alkali scrubbing but this is undesirable for economic reasons. Hydrogen chloride is more valuable as the anhydrous material and is only recovered with difficulty from an aqueous solution in a finely anhydrous form. As hydrogen chloride has economic value, its recovery is worthwhile if this can be done at minimum cost. This invention provides a process for separating hydrogen chloride in anhydrous form from vinylidene fluoride.

SUMMARY OF THE INVENTION

A gaseous mixture consisting essentially of hydrogen chloride and vinylidene fluoride is contacted with a liquid chlorobenzene. The chlorobenzene may be monochlorobenzene, ortho-dichlorobenzene, meta-dichlorobenzene or 1,2,4-trichlorobenzene. Enriched gaseous vinylidene fluoride is recovered.

BRIEF DESCRIPTION OF THE DRAWING

The figure is a schematic drawing of a process representative of this invention.

DESCRIPTION OF THE INVENTION

Vinylidene fluoride is manufactured by thermal dehydrochlorination of chloro-1,1-difluoroethane as disclosed in U.S. Patent No. 2,551,573. The reaction product of such process consists of hydrogen chloride, vinylidene fluoride, chlorodifluoroethane and possibly other products.

The vinylidene fluoride is separated from the remainder of the product by contacting the gaseous mixture with a liquid chlorobenzene. The chlorobenzene may be any one of the group consisting of monochlorobenzene, or ortho-dichlorobenzene, meta-dichlorobenzene and 1,2,4-trichlorobenzene. Para-dichlorobenzene is not useful because of its relatively high melting point. For the same reason of high melting point, the 1,2,3 and 1,3,5-isomers of trichlorobenzene are not useful. Mixtures of the above solvents may also be used. Monochlorobenzene and ortho-dichlorobenzene are the preferred solvents.

The process is carried out in any apparatus suitable for contacting gases with liquids, preferably a countercurrent gas-liquid absorption column. The vinylidene fluoride passes through the contacting apparatus undissolved while the hydrogen chloride and other components are absorbed in the solvent. While the efficiency of the process is controlled by the relative volumes of gas and liquid in contact and the time of contact, this invention broadly is not limited to any particular ratios or times since any contact will produce some useful enrichment. The operating temperatures should be in the range of from about 0° C. to about 50° C. At lower temperatures, excessive amounts of vinylidene fluoride are dissolved while at temperatures higher than about 50° C., insufficient amounts of hydrogen chloride are dissolved. The absorption process is also operated at from 0.9 to 10 atm. pressure, lower pressures, being a vacuum, are impractical while higher pressures reduce efficiency excessively.

In the preferred embodiment of this invention, the contacting is carried out in an absorption column suitable for gas-liquid contacting and a portion of the enriched material recovered from the monochlorobenzene solution is continuously recycled. The ratio of recycle to takeoff material partially controls the efficiency of the system, higher recycle ratios leading a higher efficiency, other factors being equal. The weight ratio of chlorobenzene brought into contact with the gas mixture also controls efficiency to some extent. In this invention, beyond a certain point increasingly higher liquid to gas ratios do not lead to greater efficiency. In the present process, liquid to gas weight ratios of 0.5 to 200 parts liquid, usually 6 to 70 parts liquid per part gas produce the most efficient results. In the preferred system, the ratio of recycle to takeoff gas should also be at least 0.5.

The vinylidene fluoride is collected from the system for use or further purification as needed. The method of recovering hydrogen chloride from the chlorobenzene solution may vary widely, depending on whether the original gas mixture contained only hydrogen chloride and vinylidene fluoride or other additional components also. In all cases, the chlorobenzene solution is heated to vaporize hydrogen chloride and any other volatile components from the solution, the hydrogen chloride is recovered in anhydrous form and the chlorobenzene is recycled.

Operation of the process of the present invention may be better understood by reference to the attached drawing. In the simplest form of the present invention, only two components are in the gas mixture. The process feed containing vinylidene fluoride and hydrogen chloride is fed via line 10 to countercurrent absorption column 11. The chlorobenzene enters column 11 via line 12, undissolved vinylidene fluoride leaves column 11 via line 13, while the solution of hydrogen chloride in the chlorobenzene passes from column 11 into still 14 via line 15. The solution is heated in reboiler 16 to a temperature sufficient to vaporize all of the hydrogen chloride. Vapors pass up column 14 and through partial condenser 17 where any chlorobenzene vapors are condensed. Uncondensed hydrogen chloride passes to control valve 18 where a portion of the gas is returned via line 19 to column 11. The remainder of the gas, consisting almost entirely of hydrogen chloride, leaves the system via line 20. Recycle is important to prevent vinylidene fluoride from being carried out with the hydrogen chloride. The chlorobenzene, which collects in the reboiler 16 is pumped via pump 21 and heat exchanger 22 through line 12 to column 11.

The column 11 is operated at 0° to 50° C. with the preferred temperature being about 25° C. The pressure may be from 0.9 to 10 atmospheres with the preferred pressure being about 1 atmosphere. The feed weight ratio of the chlorobenzene to gas mixture is in the range of from 6 to 70. The preferred gas feed rates are near 0.4 volume per volume of column per minute. Column 14 may be operated with a reboiler temperature near the boiling point of the chlorobenzene at one atmosphere using ordinary cooling water in condenser 17. The weight ratio of gas passing through line 19 to that leaving via line 20 should be at least 0.5. Of course, these conditions may be varied widely within the ranges previously cited, depending on the actual design and characteristics of the equipment being used. It is expected, of course, that some experimentation will be required to obtain maximum efficiency with any particular set of equipment.

As indicated earlier, the feed stream in the figure entering via line 10 presupposes separation of HCl-vinylidene mixture from other higher boiling products. This may be accomplished by means of a separating still. However, if this is inconvenient, the reaction product from the dehydrochlorination of chloro-1,1-difluoroethane consisting of hydrogen chloride, vinylidene fluoride, chlorodifluoroethane and difluoroethane may be fed directly to the absorption column. In the same manner as is shown in the figure, vinylidene fluoride and hydrogen chloride are separated. The only modification is that the solution which collects in reboiler 16 now consists of chlorobenzene, chlorodifluoroethane and difluoroethane. These three components are then separated by means of two subsequent separation stills and returned to the process cycle.

The following examples are representative embodiments of the above described process.

Example 1

The apparatus used in this example contained an absorption column which was a 2.0 dia. x 87 cm. unjacketed glass column packed with 0.05 x 0.1 x 1 inch Podbielniak "Heli Pak" packing. Two fractionating columns, which acted as the still, were a one inch dia. by 5 plate Oldershaw column surmounted by a 2.0 dia. x 16 cm. high Vigreux column, both columns were vacuum jacketed. The feed from the absorption column entered between the two fractionating columns. Other apparatus consisted of a water cooled spiral ether condenser, a one liter round bottom electrically heated flask as a reboiler, a bellows pump, a water cooled condenser and a solenoid three-way valve.

The feed gas mixture contained vinylidene fluoride, chloro-1,1-difluoroethane, 1,1-difluoroethane and hydrogen chloride. Monochlorobenzene was the absorption liquid. The operating conditions are given in the following table.

Gas flow rate (vol./vol. absorber/min.) _____ 0.44
Absorber temperature, ° C. _____ 24
Reboiler temperature, ° C. _____ 139
Pressure, atmosphere _____ 1
Recycle ratio (vol. withdrawn/vol. recycled) _____ 1.0

The following table shows the composition of the feed and product streams during three runs and various feed weight ratios of gas mixture to liquid chlorobenzene. Vinylidene fluoride is represented by $VF_2$, 1,1-difluoroethane by DFE and chloro-1,1-difluoroethane by CDFE.

| Gas feed, mole percent | Feed weight ratio of chlorobenzene to gas | Composition, mole percent | |
|---|---|---|---|
| | | Absorber overhead | Column overhead |
| $VF_2$, 15 | 108 | 99.5 | 4.8 |
| DFE+HCl, 53 | | 0.4 | 60.3 |
| CDFE, 32 | | 0.0 | 34.9 |
| $VF_2$, 15 | 62 | 99.8 | 1.6 |
| DFE+HCl, 52 | | 0.2 | 62.4 |
| CDFE, 33 | | 0.0 | 36.0 |
| $VF_2$, 14 | 27 | 27.9 | 0.0 |
| DFE+HCl, 55 | | 72.1 | 58.6 |
| CDFE, 31 | | 0.0 | 41.1 |

Example 2

Apparatus similar to that of Example 1 was used in this example except that the absorption column was a 101.6 cm. absorber packed with 3.2 mm. helicies. The absorption liquid was ortho-dichlorobenzene. The operating conditions are given in the following table.

Gas feed rate (ml./min.) _____ 200
Absorber temperature, ° C. _____ 25
Reboiler temperature, ° C. _____ 180
Pressure, atmosphere _____ 1
Recycle ratio (vol. withdrawn/vol. recycled) _____ 0
Solvent flow rate to absorber (ml./min.) _____ 20

The following table shows the composition of the feed and product streams.

| Gas feed, mole percent | Composition, mole percent | |
|---|---|---|
| | Absorber overhead | Column overhead |
| $VF_2$, 20.6 | 94.8 | 9.0 |
| DFE, 10.2 | 0.0 | 11.8 |
| CDFE, 27.8 | 0.2 | 33.2 |
| HCl, 41.4 | 5.0 | 46.0 |

The recycle ratio was changed to 0.25 and the solvent flow rate increased to 35. The following table shows the new composition of the feed and product streams.

| Gas feed, mole percent | Composition, mole percent | |
|---|---|---|
| | Absorber overhead | Column overhead |
| $VF_2$, 24.0 | 83.6 | 5.1 |
| DFE, 10.7 | 0.0 | 14.1 |
| CDFE, 25.9 | 0.1 | 35.9 |
| HCl, 39.4 | 16.3 | 44.9 |

It is to be understood that the preceding examples are representative and that said examples may be varied within the scope of the total specification, as understood by one skilled in the art, to produce essentially the same results.

As many widely different embodiments of this invention may be made without departing from the spirit and scope thereof, it is to be understood that this invention is not limited to the specific embodiments thereof, except as defined in the appended claims.

The embodiments of the invention in which an exclusive property or privilege is claimed are defined as follows:

1. The process of contacting a gaseous mixture consisting essentially of hydrogen chloride and vinylidene fluoride with a liquid chlorobenzene selected form the group consisting of monochlorobenzene, ortho-dichlorobenzene, meta-dichlorobenzene and 1,2,4-trichlorobenzene at from about 0° to about 50° C., recovering undissolved, enriched gaseous vinylidene fluoride and recovering the resultant solution of chlorobenzene and hydrogen chloride.

2. The process of claim 1 in which the gaseous mixture and the resultant solution contain chloro-1,1-difluoroethane.

3. The process of claim 2 in which the gaseous mixture and the resultant solution contain 1,1-difluoroethane.

4. The process of claim 1 wherein said contacting is carried out at from 0.9 to 10.0 atmosphere pressure.

5. Claim 4 wherein the weight ratio of said chlorobenzene to said gaseous mixture is (0.5 to 200):1.

6. Claim 5 further comprising recovering gaseous hydrogen chloride by heating said resultant chlorobenzene solution.

7. Claim 6 wherein at least about 50 percent by volume of said recovered gaseous hydrogen chloride is recycled for further contacting.

References Cited

UNITED STATES PATENTS 3,101,304   8/1963   Wiist _____ 260—653.3

OTHER REFERENCES

Josien et al: Chemical Abstracts 49, 7977f (1955).

DANIEL D. HORWITZ, *Primary Examiner.*

U.S. Cl. X.R.

23—154; 260—653, 653.5